(12) United States Patent
Fang et al.

(10) Patent No.: US 12,401,761 B2
(45) Date of Patent: Aug. 26, 2025

(54) ADAPTIVE CONNECTION-BASED GRAPHICAL USER INTERFACES FOR VIDEO CONFERENCES

(71) Applicant: Zoom Communications, Inc., San Jose, CA (US)

(72) Inventors: Jin Fang, Saratoga, CA (US); Yunfeng Guan, Suzhou (CN); Xiaoliang Shao, Suzhou (CN); Zhenxi Wang, San Jose, CA (US); Qian Wang, Suzhou (CN)

(73) Assignee: Zoom Communications, Inc., San Jose, CA (US)

( * ) Notice: Subject to any disclaimer, the term of this patent is extended or adjusted under 35 U.S.C. 154(b) by 277 days.

(21) Appl. No.: 18/159,169

(22) Filed: Jan. 25, 2023

(65) Prior Publication Data
US 2024/0248666 A1    Jul. 25, 2024

(51) Int. Cl.
*H04N 7/14* (2006.01)
*H04L 65/403* (2022.01)
*H04N 7/15* (2006.01)

(52) U.S. Cl.
CPC .......... *H04N 7/142* (2013.01); *H04L 65/403* (2013.01); *H04N 7/147* (2013.01); *H04N 7/15* (2013.01)

(58) Field of Classification Search
None
See application file for complete search history.

(56) References Cited

U.S. PATENT DOCUMENTS

| | | | |
|---|---|---|---|
| 9,210,373 B2 | 12/2015 | MacDonald | |
| 9,398,261 B1 * | 7/2016 | Pfeffer | H04N 7/157 |
| 10,838,681 B2 * | 11/2020 | Watson | G06F 3/1454 |
| 11,016,717 B1 | 5/2021 | Muthukrishnan et al. | |
| 11,256,392 B2 | 2/2022 | Ponnusamy et al. | |
| 2011/0292161 A1 | 12/2011 | Sharon et al. | |
| 2013/0162502 A1 * | 6/2013 | Lee | H04N 21/4424 |
| | | | 345/1.2 |
| 2013/0342637 A1 * | 12/2013 | Felkai | H04L 69/24 |
| | | | 348/E7.083 |
| 2017/0237986 A1 * | 8/2017 | Choi | H04W 4/80 |
| | | | 348/14.02 |
| 2018/0376106 A1 * | 12/2018 | Pandey | H04L 67/54 |
| 2021/0136130 A1 | 5/2021 | Ponnusamy et al. | |
| 2022/0337780 A1 * | 10/2022 | Huang | G06F 3/011 |
| 2023/0123771 A1 * | 4/2023 | Roylance | H04L 65/60 |
| | | | 348/14.07 |

* cited by examiner

*Primary Examiner* — Quoc D Tran
(74) *Attorney, Agent, or Firm* — Young Basile Hanlon & MacFarlane, P.C.

(57) ABSTRACT

A video conference that is in progress is run though a device, such as a portable device. Video of the video conference is displayed on a display of the device. The device detects when a connection is made between the device and an external display during the video conference that is in progress. When the device detects the connection between the device and the external display, the device causes the video of the video conference to be displayed on the external display. When the video of the video conference is displayed on the external display, a control panel is displayed on the display of the device. The device retains the connection to the video conference while the video of the video conference is displayed on the external display and the control panel is displayed on the display of the device.

20 Claims, 7 Drawing Sheets

ADAPTIVE CONNECTION-BASED GRAPHICAL USER INTERFACES FOR VIDEO CONFERENCES

FIELD

This disclosure generally relates to adaptive graphical user interfaces (GUIs) for video conferences, and in particular, UIs that are adaptive based on a connection to one or more devices.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
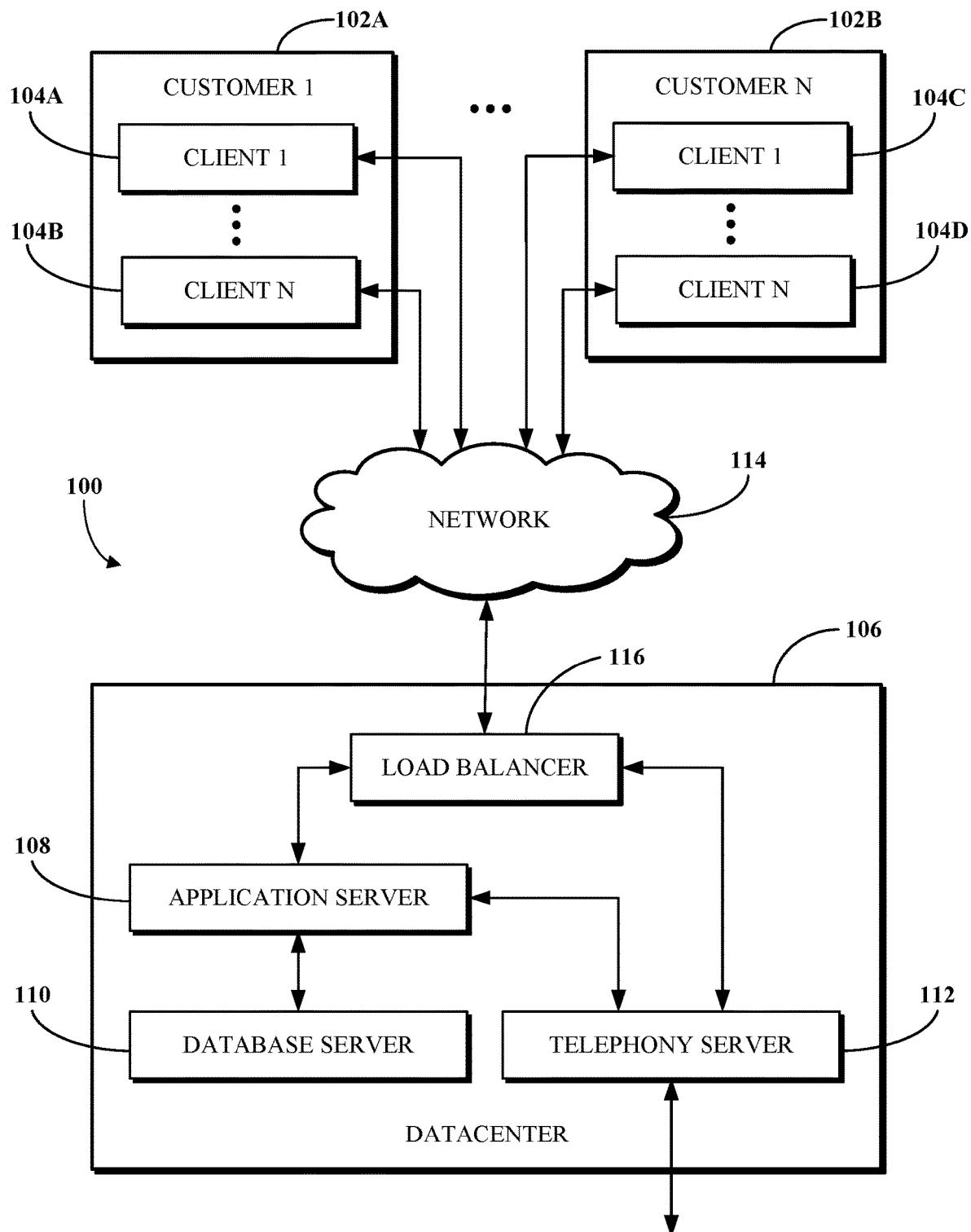
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

Software platforms, such as UCaaS platforms, can implement software services enabling communications over one or more modalities such as telephony, email, text messaging, chat, or audio or video conferencing. A modality, such as video conferencing, may be accessed using devices in communication with the software platform. Example devices that can be used to access video conferencing can include portable devices, such as mobile phones, tablet computers, and laptop computers. In some examples, video conferencing can be accessed using other devices, such as desktop computers or conference room devices.

Conference participants may often be connected to a video conference via a portable device when the need arises to switch the display of the content of the video conference from the portable device to a conference room device, such as an external monitor, while retaining the conference connection through the portable device. Typical solutions allow for the content of the video conference to be displayed on a conference room device; however, in such cases, the display is mirrored such that the portable device display and the conference room device both display identical content, resulting in an inefficient use of the available display area. Some current solutions require ultrasonic conference room equipment to detect the portable device and switch the video conference session from the portable device to the conference room device. Moving the video conference session from the portable device to the conference room device can be a significant drain on computing resources and introduces the risk of dropping the video conference session while same is being transferred between the subject devices. In addition, the ultrasonic conference room equipment can be costly to purchase and maintain, as it requires pre-configuration by information technology (IT) staff.

Implementations of this disclosure address problems such as these by adapting connection-based UIs for video conferences. A client application running on a portable device detects that an external display is connected to the portable device. Based on the detection, the client application transfers the GUI within which the media of the video conference is rendered to the external display and switches the visual output on the portable device to an adaptive GUI, such as a controller interface configured to control one or more functions of the video conference media output to the external display. The connection to the video conference is retained on the portable device, such that the video conference session is not moved to the external display or another conference room device. The adaptive GUI can be configured based on one or more user preferences, such as to customize GUI elements according to the individual user. In some examples, the adaptive GUI can be configured using a machine learning (ML) model that is trained using a data set of display preferences from previous instances of when any user connected any user device to an external display.

To describe some implementations in greater detail, reference is first made to examples of hardware and software structures used to implement adaptive connection-based GUIs for video conferences. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
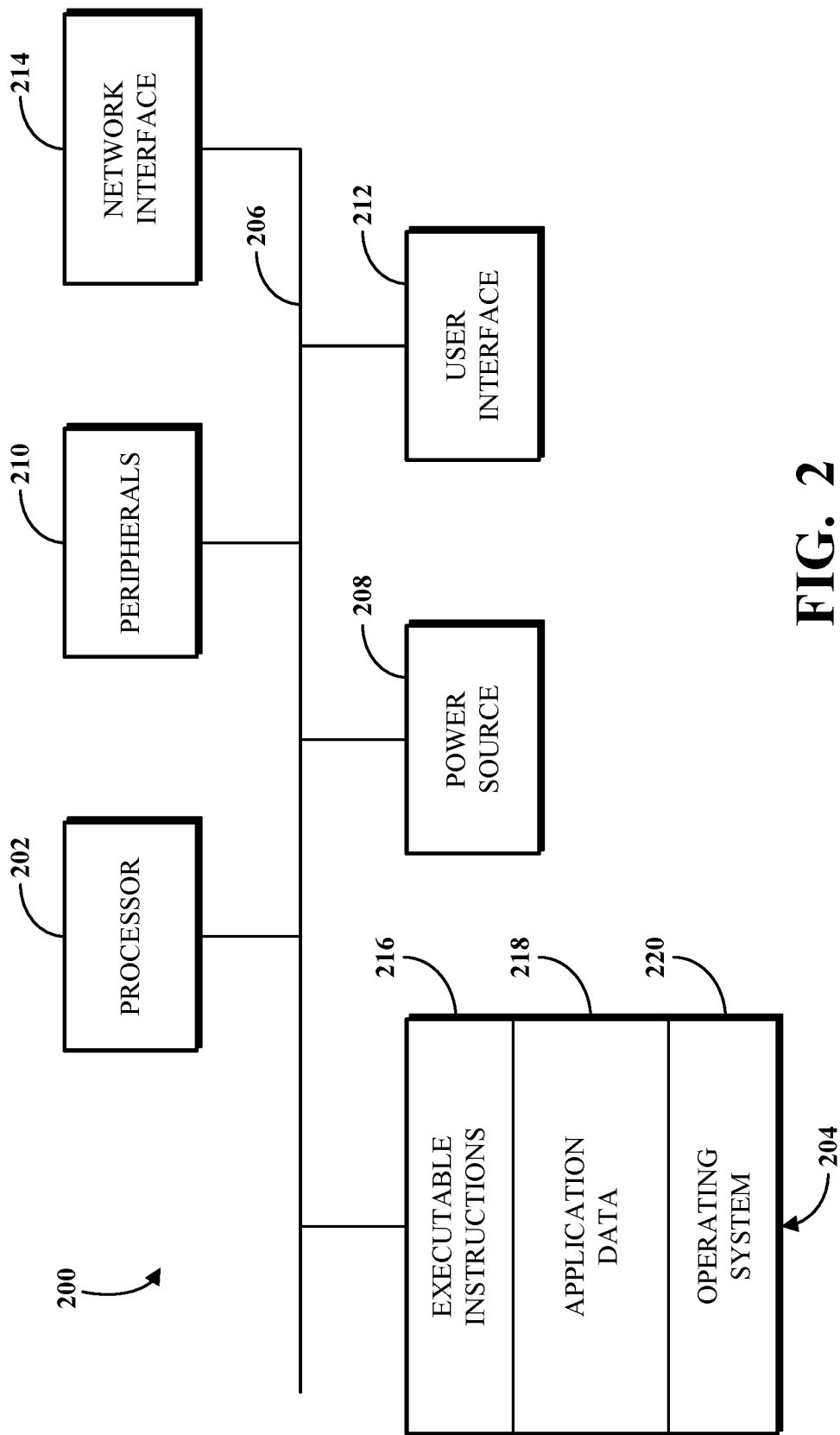
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®, an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
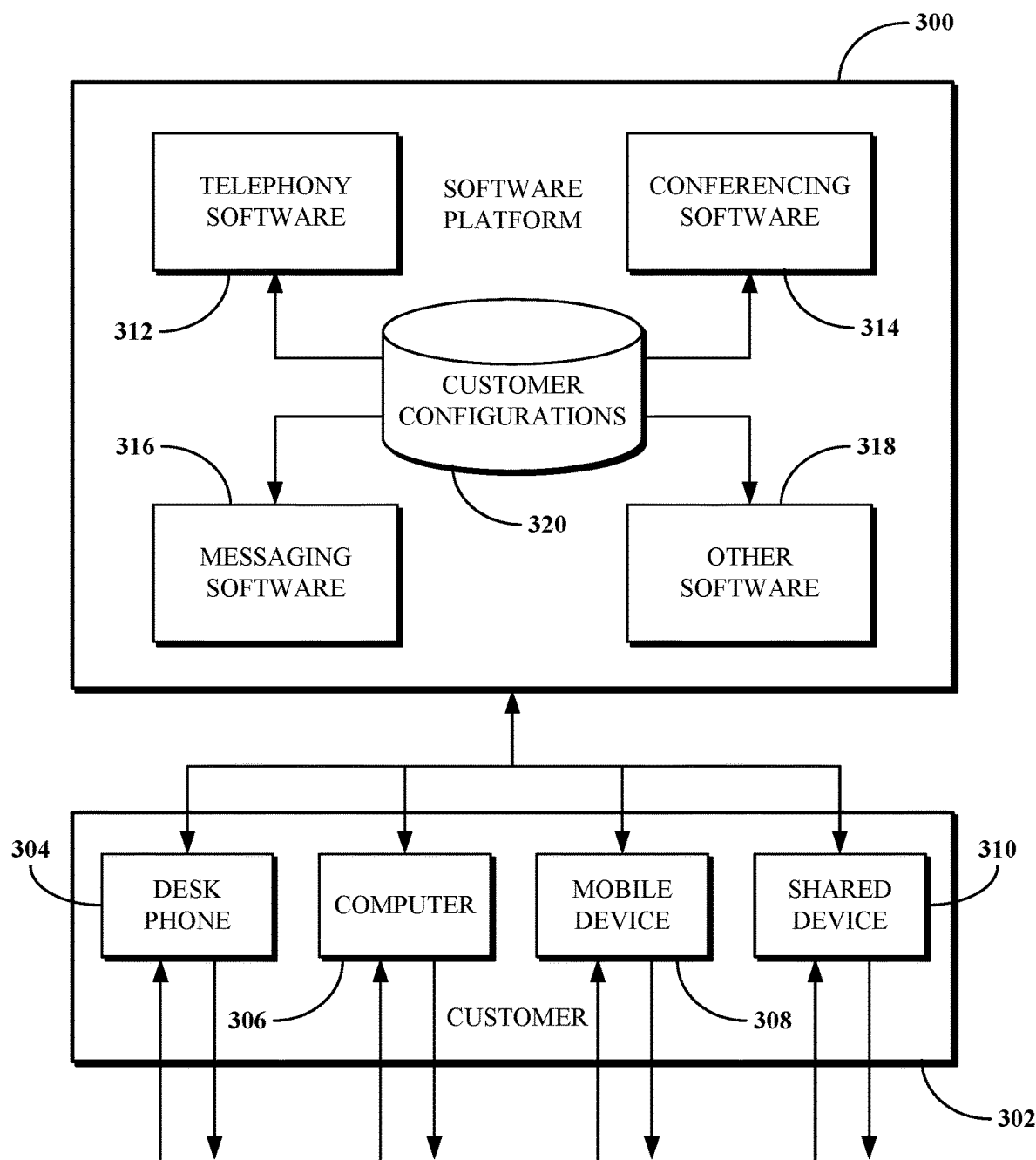
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIPenabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 enables adaptive connection-based GUIs for video conferences.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
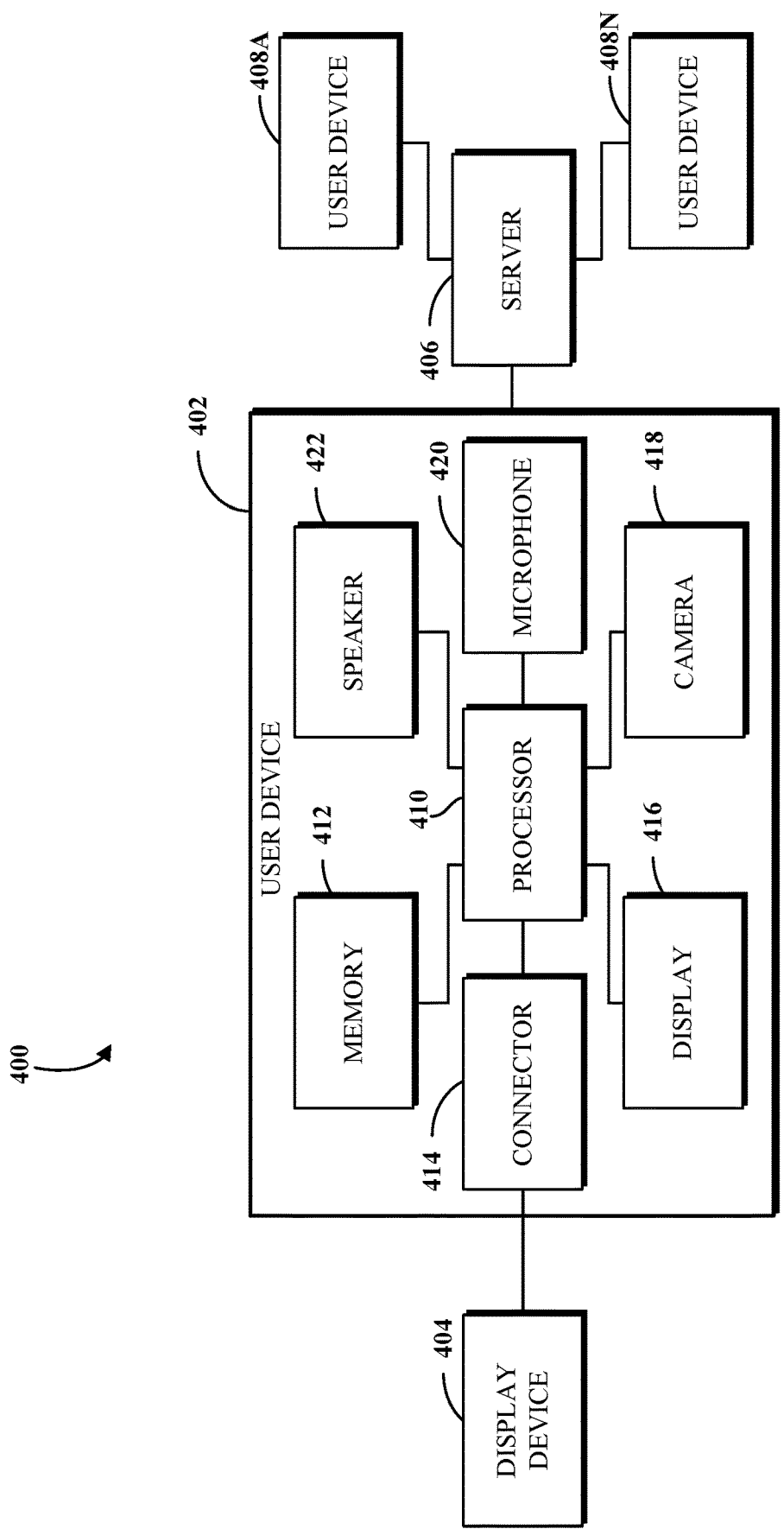
FIG. 4 is a block diagram of an example of a system for adaptive connection-based GUIs for video conferences.

FIG. 4 is a block diagram of an example of a system 400 for adaptive connection-based GUIs for video conferences. The system 400 includes a user device 402, a display device 404, a server 406, and one or more user devices 408A-N. In some implementations, the system 400 may include more than one display device. The user device 402 may be a device such as the computer 306 or the mobile device 308 shown in FIG. 3. The server 406 may be implemented as the software platform 300 shown in FIG. 3. The one or more user devices 408A-N may each be one of the clients 304 through 310 shown in FIG. 3.

The user device 402 includes a processor 410, a memory 412, a connector 414, a display 416, a camera 418, a microphone 420, and a speaker 422. The processor 410 is configured to run a client application stored on the memory 412 to connect to a video conference via the server 406. The processor 410 is configured to generate a GUI within the client application that includes video content of the video conference and display the GUI on the display 416. The GUI may be a customizable GUI such that it can display a gallery view of conference participants, a speaker view of one or more conference participants, a shared content view (e.g., a presentation or an interactive whiteboard), a chat room view, a transcription view, or another view of the video conference. The display 416 may be a touch display that is configured to obtain user input via a touch or a gesture. The camera 418 is configured to obtain video for the video conference. The microphone 420 is configured to obtain audio for the video conference. The speaker 422 is configured to output audio obtained from conference participant devices, such as the user devices 408A-N.

The processor 410 is configured to execute instructions stored in the memory 412 to cause the user device 402 to detect a connection between the user device 402 and the display device 404. Software executed on the processor 410 is configured to monitor the connector 414 to detect a connection when a device, such as the device 404, or a connector thereof, is inserted into the connector 414 or otherwise connected to the connector 414. When a connection is detected, the software executed on the processor 410 is configured to exchange information with the device 404 to perform an action, such as configure one or more settings on the device 404, for example. The one or more settings may include display settings, such as a resolution setting, a refresh rate setting, a display aspect ratio setting, or another display setting. The display device 404 is not connected to the video conference and may be an external monitor, a projector, a television, or another display that can be connected to the user device 402. The processor 410 may execute the instructions stored in the memory 412 to cause the user device 402 to detect the connection via the connector 414 using the client application. In one example, the connection may be detected prior to joining the video conference. In another example, the connection may be detected during the video conference. The connector 414 may be a wired connector, such as a universal serial bus (USB) connector or another type of connector. In some implementations, the connector 414 may enable a wireless connection, for example, using near-field communication (NFC), Bluetooth, Wi-Fi, or another wireless connection.

When the software executed using the processor 410 detects the connection between the user device 402 and the display device 404, the software transfers the display of the GUI to the display device 404. Transferring the display of the GUI to the display device 404 includes transmitting data configured to cause a rendering of the GUI from the device 402 to the display device 404. In some implementations, the processor 410 may be configured to execute instructions stored on the memory 412 to render the GUI based on the display capabilities of the display device 404 prior to transferring the GUI for display on the display device 404. For example, the user device 402 can be configured to detect the display capabilities of the display device 404 and generate or obtain a second GUI based on the display capabilities of the display device 404 while continuing to output the GUI at the user device 402 such that the second GUI is ready to be transferred to the display device 404. Obtaining the second GUI may include accessing the second GUI from a local data store, such as memory 412, or remote data store, such as a data store on server 406. When the user device 402 is connected to a video conference that is in progress, the software executed using the processor 410 transfers the display of the GUI to the display device 404 and retains the connection to the video conference on the user device 402. The processor 410 is configured to execute instructions stored on the memory 412 to generate or obtain the second GUI based on the detection of the connection between the user device 402 and the display device 404 and display the second GUI on the display 416. In some implementations, the second GUI may be a customizable GUI that can include a controller to control functions of the video conference, a gallery view of conference participants, a speaker view of one or more conference participants, or an interactive whiteboard. When the second GUI is displayed on the display 416, the processor 410 continues to display the GUI on the display device 404.

The user device 402 uses the adaptive connection-based GUIs to display different video conference information on multiple displays when one or more display devices, such as display device 404, are connected to the user device 402. The video conference is run though the user device 402. When the display device 404 is connected to the user device 402, a first GUI being displayed on the user device is transferred to the display device 404, and the display 416 of the user device 402 is updated to display a second GUI associated with the video conference. When the first GUI is being displayed on the display device 404 and the second GUI is displayed on the user device 402, the user device 402 retains the connection to the video conference.

Figure 5:
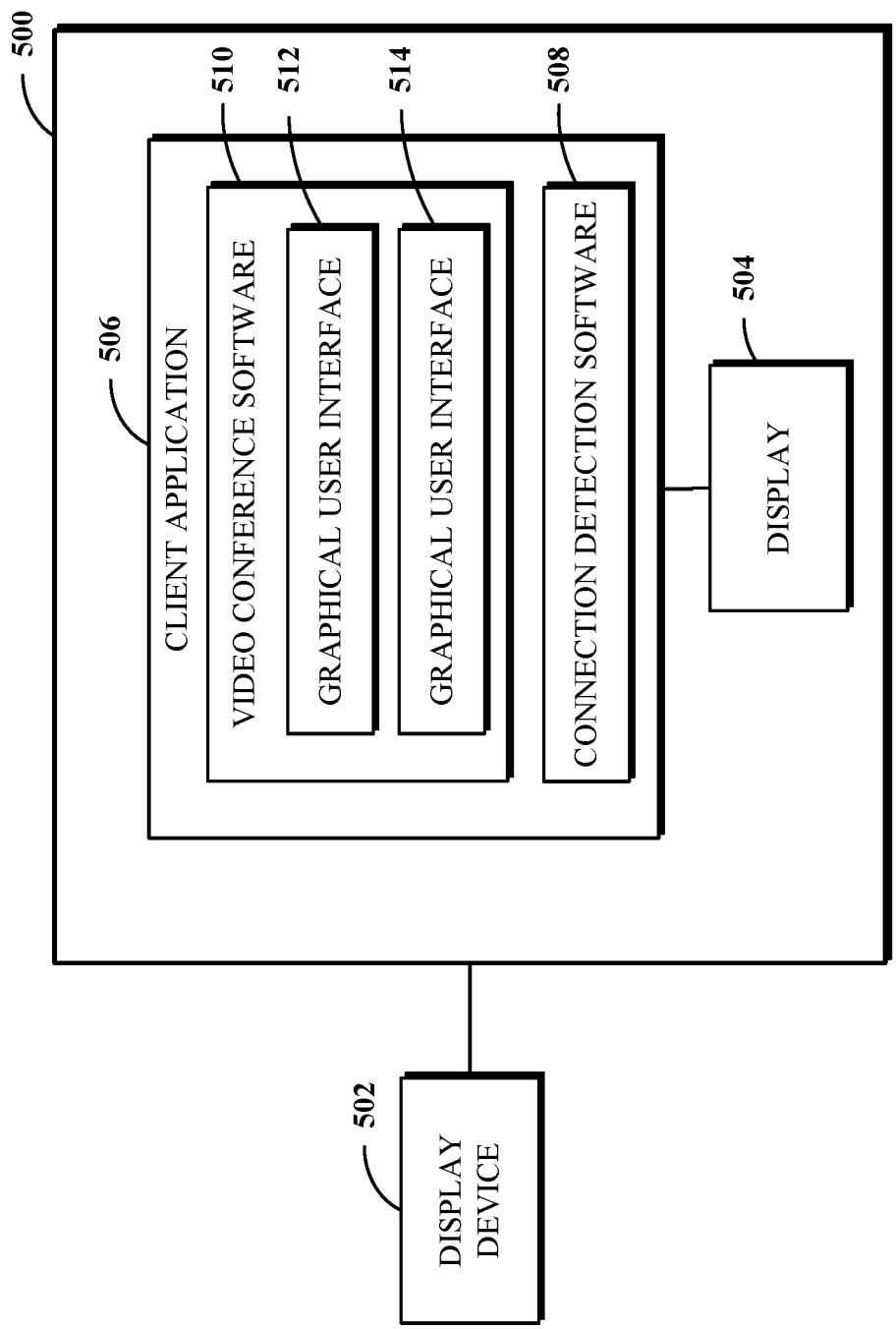
FIG. 5 is a block diagram of an example of a device configured for adaptive connection-based GUIs for video conferences.

FIG. 5 is a block diagram of an example of a device 500 configured for adaptive connection-based GUIs for video conferences. The device 500 may, for example, be the user device 402 shown in FIG. 4. In this example, the device 500 is connected to a display device 502. The display device 502 may, for example, be the display device 404 shown in FIG. 4. The device 500 includes a display 504, which may, for example, be the display 416 shown in FIG. 4.

The device 500 includes a client application 506 that is stored in a memory, such as the memory 412 shown in FIG. 4 and executed by a processor, such as the processor 410 shown in FIG. 4. For example, the client application 506 may be software usable to access software services of a software platform (e.g., a UCaaS platform) from the device 500. The client application 506 includes connection detection software 508 and video conference software 510.

The connection detection software 508 is configured to detect when the display device 502 is connected to the device 500. The connection detection software 508 is configured to monitor a connector, such as the connector 414 shown in FIG. 4, to detect a connection when a device, such as the display device 502, or a connector thereof, is inserted into the connector 414 or otherwise connected to the connector 414. When a connection is detected, the connection detection software 508 is configured to exchange information with the display device 502 to perform an action, such as configure one or more settings on the display device 502, for example. The one or more settings may include display settings, such as a resolution setting, a refresh rate setting, a display aspect ratio setting, or another display setting. In addition, the connection detection software 508 is configured to detect when the display device 502 is disconnected from the device 500. When the display device 502, or a connector thereof, is removed from the connector 414 or the connection is otherwise terminated, the connection detection software determines that the display device 502 is disconnected from the device 500. When the connection detection software 508 no longer detects a connection, the device 500 is configured to perform an action, such as configure one or more settings on a display of the device 500, for example.

The video conference software 510 is client-side software that is configured to communicate with server-side software that facilitates a video conference (e.g., the conferencing software 314 of FIG. 3) to connect the device 500 to the video conference. The video conference software 510 is configured to process audio data of the conference such that the audio of the conference is output via a speaker of the device 500, such as the speaker 422 shown in FIG. 4. The video conference software 510 is configured to process video data of the conference to generate or obtain a GUI 512 and a GUI 514. The GUI 512 and the GUI 514 may be generated based on a detection of a connection between the device 500 and the display device 502 by the connection detection software 508. If multiple display devices are connected to the device 500, the video conference software 510 is configured to generate a GUI for each connected display device. The GUI 512 and the GUI 514 may form a switchable UI that is configured to switch between the GUI 512 and the GUI 514 based on a detected connection between the device 500 and the display device 502 or a detected disconnection of the display device 502 from the device 500. The GUI 512 and the GUI 514 are output via a display, such as the display 504, the display device 502, or both.

The GUI 512 and the GUI 514 may be configurable, for example, based on a user preference. The GUI 512 and the GUI 514 can be configured to have different GUI information based on the user preference in order to render different displays as described in the example use cases below. In some implementations, the user preference may be learned using an ML model. The ML model may be trained using a data set of display preferences of previous instances of when a user connected any device, such as the device 500 to any display, such as the display device 502. The ML model may be updated each time the device 500 is connected to a display. The ML model may determine the GUI configurations based on the display device type to which the device 500 is connected. The ML model may base the GUI configurations on one or more display device capabilities. The one or more display device capabilities may include a display size, a display aspect ratio, a display resolution, a display refresh rate, or another device capability. In an example, the ML model may determine that when the device 500 is connected to the display device 502, the user prefers to display a GUI showing conference participants in a gallery view on the display device 502 and a GUI showing conference controls on the device 500.

The following example use case is provided as an illustrative implementation of the device 500 shown in FIG. 5. In this example, the device 500 may be a portable device, such as a mobile phone or a tablet computer. The device 500 is connected to a video conference via the video conference software 510. The video conference software 510 is configured to output the GUI 512 for display on the display 504. In this example, the GUI 512 is configured to include GUI information for rendering conference participants on the display 504. At some point during the conference, the connection detection software 508 detects that display device 502 is connected to the device 500. In this example, the display device 502 may be an external display. Based on the detected connection between the display device 502 and the device 500, the video conference software 510 is configured to output the GUI 512 for display on the display device 502 such that the rendering of the conference participants continues on the display device 502. While the GUI 512 is being displayed on the device 502, the video conference software 510 is configured to output the GUI 514 for display on the display 504. In this example, the GUI 514 is configured to include GUI information for rendering a control panel that includes one or more controls for the video conference. While the GUI 512 is displayed on the display device 502 and the GUI 514 is displayed on the display 504, the video conference software 510 is configured to retain the connection to the video conference via the device 500.

At some point during the conference, the connection detection software 508 detects that the display device 502 is disconnected from the device 500. Based on the detected disconnection of the display device 502 from the device 500, the video conference software 510 is configured terminate the output of the GUI 512 to the device 502, terminate the output of the GUI 514 to the display 504, and output the GUI 512 for display on the display 504 such that the rendering of the conference participants continues on the display 504 of the device 500. While the GUI 512 is displayed on the display 504, the video conference software 510 is configured to retain the connection to the video conference via the device 500.

In a second example use case, the device 500 may be a portable device, such as a mobile phone or a tablet computer that is connected to a video conference via the video conference software 510. In this example, the video conference software 510 is configured to output the GUI 512 for display on the display device 502 and output the GUI 514 for display on the display 504. The display device 502 may be an external display, such as a projector in a conference room. In this example, the GUI 512 is configured to include GUI information for rendering conference participants on the display device 502 and the GUI 514 is configured to include GUI information for rendering a control panel on the display 504. The control panel includes controls for the video conference.

At some point during the conference, the video conference software 510 receives an input via the control panel. The input may be a touch input or a gesture input that indicates a command to change the GUI that is displayed on the display device 502, the display 504, or both. In this example, the command may indicate to display a whiteboard on the display device 502 and conference participants on the display 504. Based on the command, the video conference software 510 is configured to output the GUI 512 for display on the display 504 such that the rendering of the conference participants continues on the display 504.

While the GUI 512 is being displayed on the display 504, the video conference software 510 is configured to output the GUI 514 for display on the display device 502. In this example, the GUI 514 is configured to include GUI information for rendering a whiteboard of the video conference. In some implementations, the video conference software 510 may be configured to hide the control panel so that it can be accessed via a touch input (e.g., tapping on an icon on the display 504) or a gesture input (e.g., swiping on the display 504). While the GUI 512 is displayed on the display 504 and the GUI 514 is displayed on the display device 502, the video conference software 510 is configured to retain the connection to the video conference via the device 500. Although this example use case describes rendering a whiteboard of the video conference on the display device 502 and rendering conference participants on the display 504, other information can be rendered on the displays. For example, the video conference software 510 may be configured to display a participant (e.g., a speaker) on the display device 502 and conference participants on the display 504 based on the command.

In a third example use case, the device 500 may be a laptop computer or a desktop computer that is connected to multiple external monitors. In this example, the device 500 is connected to three external monitors and configured to connect to a video conference via the video conference software 510. The video conference software 510 is configured to output the GUI 512 for display on the first external monitor, output the GUI 514 for display on the second external monitor, and output a third graphical UI for display on the third external monitor. In this example, the GUI 512 is configured to include GUI information for rendering conference participants on the first external monitor, the GUI 514 is configured to include GUI information for rendering a presentation on the second external monitor, and the third GUI is configured to include GUI information for rendering a whiteboard on the third external monitor. The configuration of the information displayed on each external monitor may be based on a user preference. In an example, the user preference may be learned using an ML model. The ML model may be trained using a data set of display preferences of previous instances of when a user connected the device 500 to multiple external monitors. In some implementations, the user preference may be based on the type of video conference to which the device 500 is connected. For example, a first user preference may be used for a webinar, a second user preference may be used for a small video conference (e.g., less than 10 participants), and a third user preference may be used for a large video conference (e.g., greater than 10 participants).

In a webinar example, the user preference may indicate to display a speaker on the first external monitor, a presentation on the second external monitor, and participant comments and/or questions on the third external monitor. In a small video conference example, the user preference may indicate to display a speaker on the first external monitor, a whiteboard on the second external monitor, and a chat room on the third external monitor. In a large video conference example, the user preference may indicate to display a speaker on the first external monitor and to display the other participants spread across the second and third external monitors.

Figure 6B:
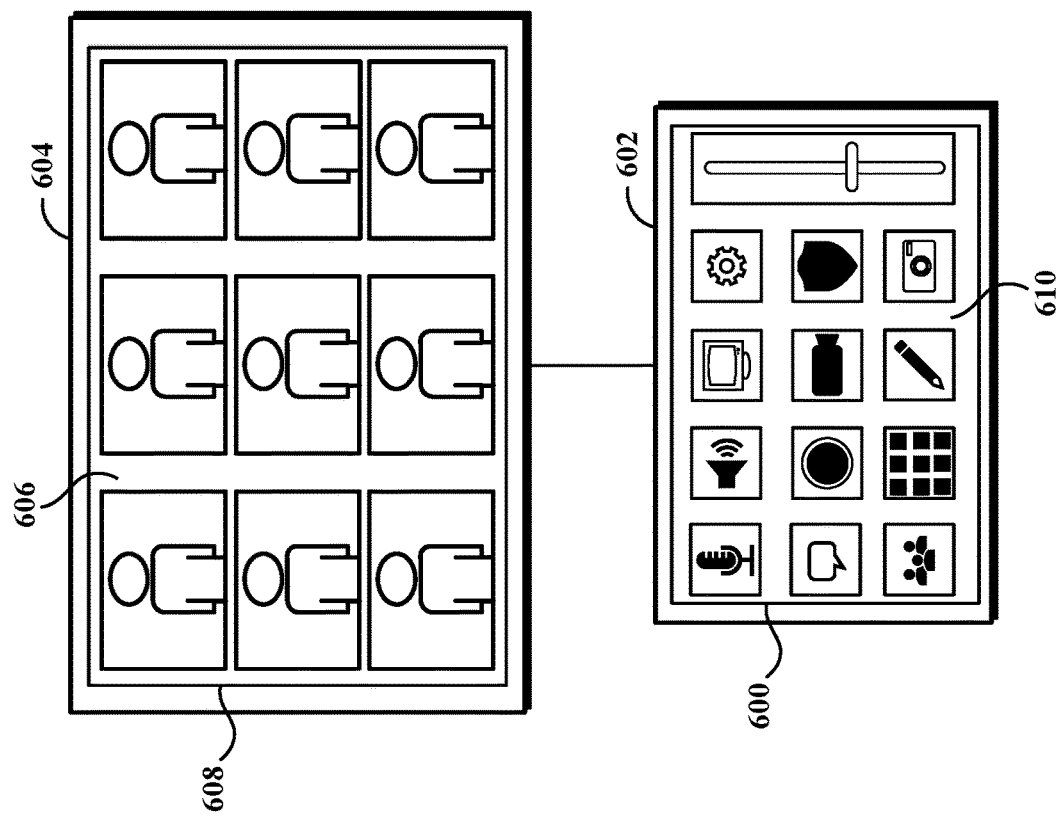
FIG. 6B is a diagram of an example of a display of the portable device of FIG. 6A when the portable device is connected to an external device.
Figure 6A:
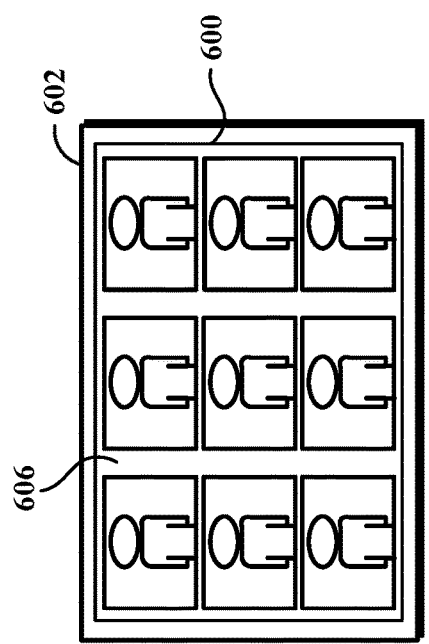
FIG. 6A is a diagram of an example of a display of a portable device that is configured for adaptive connection-based GUIs for video conferences prior to connection to an external device.

FIG. 6A is a diagram of an example of a display 600 of a portable device 602 that is configured for adaptive connection-based GUIs for video conferences prior to connection to an external device 604. FIG. 6B is a diagram of an example of the display 600 of the portable device 602 shown in FIG. 6A when the portable device 602 is connected to the external device 604. The portable device 602 may, for example, be the device 500 shown in FIG. 5. The external device 604 may, for example, be the display device 502 shown in FIG. 5.

The portable device 602 is connected to a video conference. The display 600 includes a GUI 606. The GUI 606 is configurable and can display information based on a user preference. In this example, the GUI 606 is configured to display conference participants prior to a connection between the portable device 602 and the external device 604. In other examples, the GUI 606 can be configured to display a participant that is speaking in the video conference, a presentation, a whiteboard, a chat room, one or more conference controls, or another visual output associated with the video conference. In some examples, the GUI 606 can be configured to display various combinations of a participant that is speaking in the video conference, a presentation, a whiteboard, a chat room, one or more conference controls, or another visual output associated with the video conference in one or more portions of the GUI 606.

As shown in FIG. 6B, when the portable device 602 is connected to the external device 604, the information from the GUI 606 is transferred to a display 608 of the external device 604 such that the display of the conference participants continues on the display 608 of the external device 604. While the GUI 606 displayed on the display 608 of the external device 604, the display 600 of the portable device 602 is configured to display an updated GUI 610. The updated GUI 610 is configurable and can display information based on a user preference. In this example, the updated GUI 610 is configured to display a control panel to control one or more functions of the conference. In other examples, the updated GUI 610 can be configured to display a participant that is speaking in the video conference, a presentation, a whiteboard, a chat room, one or more conference controls, or another visual output associated with the video conference. In some examples, the updated GUI 610 can be configured to display various combinations of a participant that is speaking in the video conference, a presentation, a whiteboard, a chat room, one or more conference controls, or another visual output associated with the video conference in one or more portions of the updated GUI 610.

The control panel can be configured to include one or more buttons or sliders to control the one or more functions of the conference. For example, the control panel may include a mute button that is configured to mute or unmute a microphone of the portable device 602. The control panel can be configured to include a video button that is used to start or stop a camera of the portable device. In some examples, the control panel can be customized to include a share button configured to enable sharing of content, such as a presentation, a screen share, or other content, from the portable device 602 and/or a security button to enable or disable one or more features for the conference. Example features that can be enabled via the security button include locking the conference to prevent other participants from joining the conference in progress, enabling or disabling a waiting room for the conference, enabling or disabling screen share capabilities for participants, enabling or disabling chat capabilities for participants, enabling or disabling participants to unmute themselves, or enabling or disabling participants to annotate a shared screen. A view button can be configured to be displayed on the control panel where the view button is configured to change a layout of the GUI 606 on the external device 604 and/or the GUI 610 on the portable device 602. Some configurations of the control panel may include a camera control button that is configured to change a camera setting, a camera preset, or switch to a different camera, a participants button that is configured to enable viewing and management of the conference participants, a record button that is configured to start and stop recording of the conference, and/or a chat button that is configured to access an in-conference chat room. One or more control panel configurations may include a settings button configured to access conference settings, a volume slider that is configured to adjust a speaker volume of the portable device 602, and/or an exit button that is configured to end the video conference.

Figure 7:
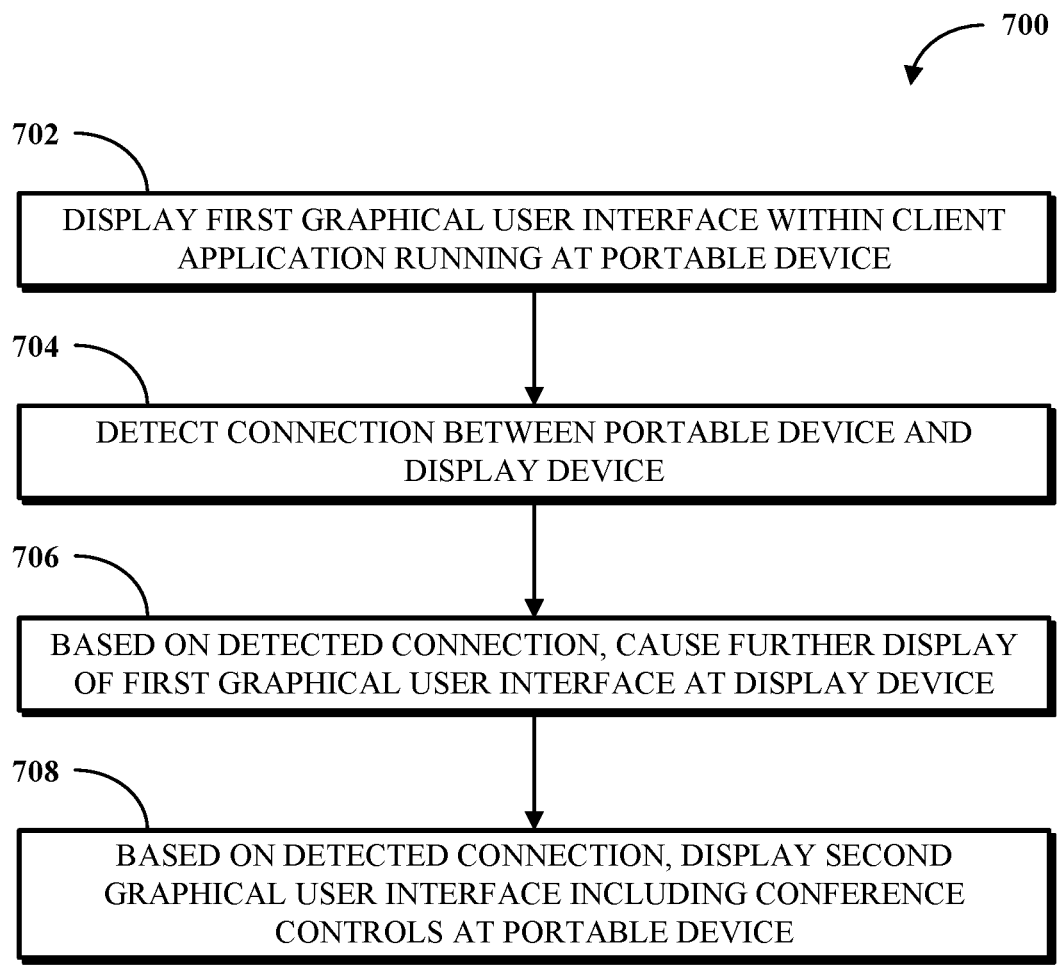
FIG. 7 is a flowchart of an example of a method for generating adaptive connection-based GUIs for video conferences.

To further describe some implementations in greater detail, reference is next made to examples of techniques which may be performed by or using a device for generating adaptive connection-based GUIs for video conferences. FIG. 7 is a flowchart of an example of a method 700 for generating adaptive connection-based GUIs for video conferences. The method 700 can be executed using computing devices, such as the systems, hardware, and software described with respect to FIGS. 1-6B. The method 700 can be performed, for example, by executing a machine-readable program or other computer-executable instructions, such as routines, instructions, programs, or other code. The steps, or operations, of the method 700 or another technique, method, process, or algorithm described in connection with the implementations disclosed herein can be implemented directly in hardware, firmware, software executed by hardware, circuitry, or a combination thereof.

For simplicity of explanation, the method 700 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 702, the method 700 includes displaying a first GUI within a client application running at a portable device. The portable device is connected to a video conference. The first GUI includes video content of the video conference. Audio for the video conference may be obtained via a microphone of the portable device. Video for the video conference may be obtained via a camera of the portable device.

At 704, the method 700 includes detecting a connection between the portable device and a display device. The display device may be an external display that is not connected to the video conference. The detected connection may be a wired connection or a wireless connection. For example, a wired connection may be via a USB connector (e.g., USB-A, USB-B, or USB-C), a high definition multimedia interface (HDMI) connector, a video graphics array (VGA) connector, a digital visual interface (DVI) connector, a display port connector, or another type of connector. Example wireless connections include NFC, Bluetooth, Wi-Fi, or other wireless connections.

At 706, the method 700 includes, based on the detected connection, causing a further display of the first GUI at the display device. The client application causes the further display of the first GUI at the display device while retaining the connection to the video conference via the portable device. The further display of the first GUI at the display device includes GUI information for rendering, at the display device, one or more conference participants, a whiteboard of the video conference, a presentation of the video conference, a text transcription of the audio of the video conference, or a chat room for the video conference.

At 708, the method 700 includes, based on the detected connection, displaying a second GUI that includes conference controls at the portable device. The client application displays the second GUI at the portable device while displaying the first GUI at the display device. In some implementations, the first GUI and the second GUI may form a switchable UI that is configured to switch between the first GUI and the second GUI based on the detected connection between the portable device and the display device or a detected disconnection of the display device from the portable device. In some implementations, second GUI may be automatically generated based on a current status of the video conference. For example, if someone is sharing their screen, the second GUI may be different than the second GUI of a one-on-one video conference.

An aspect may include a method that includes displaying, at a portable device connected to a video conference, a first GUI that includes first video content of the video conference with a client application running at the portable device. The method may include detecting, during the video conference by the client application, a connection between the portable device and a display device. Based on the detected connection, the method may include causing, by the client application while retaining the connection to the video conference via the portable device, a further display of the first GUI at the display device instead of the portable device. Based on the detected connection, the method may include displaying, at the portable device while the first GUI remains displayed at the display device, a second GUI that includes second video content of the video conference.

An aspect may include a device that includes a processor and a display. The processor may be configured to run a client application. The display may be configured to display a first GUI that includes first video content of a video conference within the client application. The processor may be configured to detect, during the video conference, a connection between the device and a display device. The processor may be configured to, based on the detected connection, cause a further display of the first GUI at the display device instead of the device. The processor may be configured to, based on the detected connection, retain the connection to the video conference. The processor may be configured to, based on the detected connection, display a second GUI that includes second video content of the video conference on the display while the first GUI remains displayed at the display device.

An aspect may include a non-transitory computer-readable medium comprising instructions stored in a memory, that when executed by a processor, cause the processor to perform operations. The operations may include displaying, at a portable device connected to a video conference, a first GUI that includes first video content of the video conference within a client application running at the portable device. The operations may include detecting, during the video conference by the client application, a connection between the portable device and a display device. The operations may include, based on the detected connection, causing, by the client application while retaining the connection to the video conference via the portable device, a further display of the first GUI at the display device instead of the portable device. The operations may include, based on the detected connection, displaying, at the portable device while the first GUI remains displayed at the display device, a second GUI that includes second video content of the video conference.

In one or more aspects, the second GUI may include controls for the video conference. In one or more aspects, the display device may be an external display that is not connected to the video conference. In one or more aspects, the further display of the first GUI at the display device may include graphical user interface information for rendering conference participants on the display device. In one or more aspects, the further display of the first GUI at the display device may include graphical user interface information for rendering a whiteboard of the video conference on the display device. In one or more aspects, the layouts of the first GUI and the second GUI may each be configurable by a user of the portable device. In one or more aspects, the client application may be used to configure a switchable interface configured to switch between the first GUI and the second GUI on the device based on the detected connection. In one or more aspects, the first GUI may be displayed on the display based on a determination that the device and the display device are disconnected. In one or more aspects, the display of the second GUI on the display may be terminated based on a determination that the device and the display device are disconnected. In one or more aspects, the first GUI may be displayed on the display. In one or more aspects, the further display of the first GUI may include GUI information for rendering a presentation of the video conference. In one or more aspects, the further display of the first GUI may include GUI information for rendering a text transcription of the audio of the video conference. In one or more aspects, it may be determined that the portable device and the display device are disconnected. In one or more aspects, the display of the second GUI at the portable device may be terminated. In one or more aspects, the first GUI may be displayed at the portable device. In one or more aspects, audio for the video conference may be obtained via a microphone of the portable device when displaying the first GUI at the display device and the second GUI is displayed at the portable device. In one or more aspects, video for the video conference may be obtained via a camera of the portable device when the first GUI is displayed at the display device and the second GUI is displayed at the portable device. In one or more aspects, the further display of the first GUI at the display device may include GUI information for rendering a chat room of the video conference on the display device. In one or more aspects, the further display of the first GUI at the display device may include GUI information based on a user preference. In one or more aspects, the further display of the first GUI at the display device may include GUI information based on a user preference that is learned using an ML model.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
    displaying, at a portable device connected to a video conference, a first graphical user interface (GUI) that includes first video content of the video conference within a client application running at the portable device;
    detecting, during the video conference by the client application, a connection between the portable device and a display device;
    based on the detected connection:
        causing, by the client application while retaining the connection to the video conference via the portable device, a further display of the first GUI at the display device instead of the portable device; and
        displaying, at the portable device while the first GUI remains displayed at the display device, a second GUI that includes second video content of the video conference, wherein the second GUI is configured using a machine learning (ML) model that is trained using a data set of previous instances of display preferences.

2. The method of claim 1, wherein the second GUI includes controls for the video conference.

3. The method of claim 1, wherein the display device is an external display that is not connected to the video conference.

4. The method of claim 1, wherein the further display of the first GUI at the display device includes graphical user interface information for rendering conference participants on the display device.

5. The method of claim 1, wherein the further display of the first GUI at the display device includes graphical user interface information for rendering a whiteboard of the video conference on the display device.

6. The method of claim 1, wherein layouts of the first GUI and the second GUI are each configurable by a user of the portable device.

7. A device comprising:
    a processor configured to run a client application; and
    a display configured to display a first graphical user interface (GUI) that includes first video content of a video conference within the client application;
    the processor further configured to:
        detect, during the video conference, a connection between the device and a display device; and
        based on the detected connection:
            cause a further display of the first GUI at the display device instead of the device;
            retain the connection to the video conference; and
            display a second GUI that includes second video content of the video conference on the display while the first GUI remains displayed at the display device, wherein the second GUI is configured using a machine learning (ML) model that is trained using a data set of previous instances of display preferences.

8. The device of claim 7, wherein the connection between the device and the display device is a wireless connection.

9. The device of claim 7, wherein the processor is further configured to:
    configure, using the client application, a switchable interface configured to switch between the first GUI and the second GUI on the device based on the detected connection.

10. The device of claim 7, wherein the processor is further configured to:
    display the first GUI on the display based on a determination that the device and the display device are disconnected.

11. The device of claim 7, wherein the processor is further configured to:

terminate the display of the second GUI on the display based on a determination that the device and the display device are disconnected; and display the first GUI on the display.

12. The device of claim 7, wherein the further display of the first GUI includes GUI information for rendering a presentation of the video conference.

13. The device of claim 7, wherein the further display of the first GUI includes GUI information for rendering a text transcription of audio of the video conference.

14. A non-transitory computer-readable medium comprising instructions stored in a memory, that when executed by a processor, cause the processor to perform operations comprising:

displaying, at a portable device connected to a video conference, a first graphical user interface (GUI) that includes first video content of the video conference within a client application running at the portable device;

detecting, during the video conference by the client application, a connection between the portable device and a display device;

based on the detected connection:
causing, by the client application while retaining the connection to the video conference via the portable device, a further display of the first GUI at the display device instead of the portable device; and
displaying, at the portable device while the first GUI remains displayed at the display device, a second GUI that includes second video content of the video conference, wherein the second GUI is configured using a machine learning (ML) model that is trained using a data set of previous instances of display preferences.

15. The non-transitory computer-readable medium of claim 14, the operations further comprising:

determining that the portable device and the display device are disconnected;

terminating the display of the second GUI at the portable device; and displaying the first GUI at the portable device.

16. The non-transitory computer-readable medium of claim 14, the operations further comprising:

obtaining audio for the video conference via a microphone of the portable device when displaying the first GUI at the display device and displaying the second GUI at the portable device.

17. The non-transitory computer-readable medium of claim 14, the operations further comprising:

obtaining video for the video conference via a camera of the portable device when displaying the first GUI at the display device and displaying the second GUI at the portable device.

18. The non-transitory computer-readable medium of claim 14, wherein the further display of the first GUI at the display device includes GUI information for rendering a chat room of the video conference on the display device.

19. The non-transitory computer-readable medium of claim 14, wherein the further display of the first GUI at the display device includes GUI information based on a user preference.

20. The non-transitory computer-readable medium of claim 14, wherein the further display of the first GUI at the display device includes GUI information based on a user preference that is learned using the ML model.

* * * * *